United States Patent [19]
Lindblom

[11] 3,720,247
[45] March 13, 1973

[54] ARRANGEMENT FOR MEASURING THE LENGTH OF OBLONG OBJECTS

[75] Inventor: Karl Thore Lindblom, Alfta, Sweden

[73] Assignee: Ostbergs Fabriks AB, Alfta, Sweden

[22] Filed: Nov. 1, 1971

[21] Appl. No.: 194,364

[30] Foreign Application Priority Data

Nov. 6, 1970  Sweden ............................. 15034/70

[52] U.S. Cl. .................... 144/3 D, 83/369, 144/2 Z, 144/246 G
[51] Int. Cl. ........................ B27b 25/02, B27b 31/00
[58] Field of Search ....... 144/3 D, 2 Z, 246 R, 246 E, 144/246 F, 246 G, 309 AC; 143/55 R, 55 A, 55 B; 83/208, 369

[56] References Cited

UNITED STATES PATENTS

| | | | |
|---|---|---|---|
| 3,448,647 | 6/1969 | Miller et al. | 83/208 X |
| 3,108,509 | 10/1963 | Felix | 83/369 X |
| 3,642,041 | 2/1972 | Hamilton et al. | 144/3 D X |
| 2,843,165 | 7/1958 | Sherron | 144/246 F X |
| 3,587,681 | 6/1971 | Wehr et al. | 144/2 Z |
| 3,542,099 | 11/1970 | Gibson | 144/3 D |
| 3,457,974 | 7/1969 | Mitten | 144/246 R X |

*Primary Examiner*—Andrew R. Juhasz
*Assistant Examiner*—James F. Coan
*Attorney*—Ralph E. Parker et al.

[57] ABSTRACT

This invention relates to the measuring and cross-cutting of tree stems advanced by feed rolls. Upstream of the cross-cutting member two measuring rollers are pressed resiliently against the stem in diametrically opposed places. One of the measuring rollers is connected to a transmitter for signaling the stem length corresponding to the rotation of the measuring roller to a control unit. When a desired stem length has been achieved, the control unit stops the feed rolls and starts the movement of the cross-cutting member against the stem.

5 Claims, 1 Drawing Figure

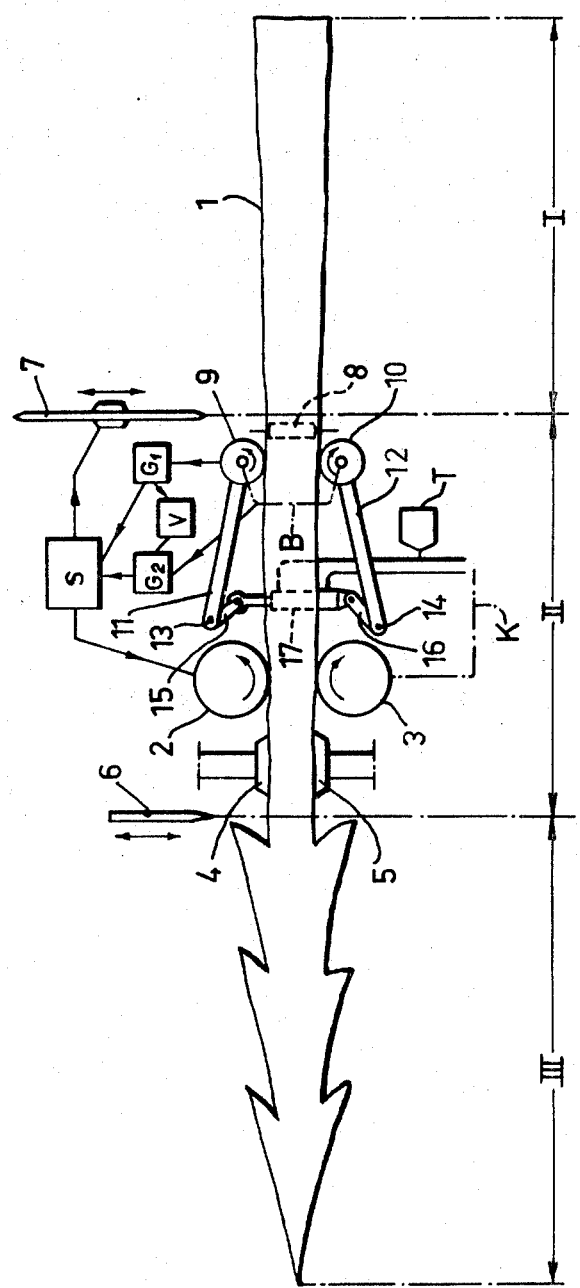

ARRANGEMENT FOR MEASURING THE LENGTH OF OBLONG OBJECTS

This invention relates to an arrangement for measuring and cross-cutting tree stems or the like advanced in their longitudinal direction by a feed unit, for example feed rolls.

In arrangements of this type in many cases a counting mechanism or the like is connected to the drive rolls for the timber, for measuring the length of the timber advanced between the rolls. In those cases when the timber offers resistance to its advancement, there is a risk that the drive rolls will slip whereby a misleading timber length will be indicated. A typical example of roll feed of timber when resistance may be encountered is the delimbing of trees which now usually is carried out by mechanical equipment, in such a way, that the drive or feed rolls pull the tree through a ring of knives shearing off limbs and branches. Usually the stem is cross-cut to desired lengths subsequent to its delimbing, and in those cases when the cross-cutting is to be carried out automatically, the function of the cross-cutting member is controlled by the counting mechanism of the feed rolls. The slightest slip obviously will result in cutting stem pieces which are too short, and which either must be rejected or sold at a substantially reduced price. It should be obvious to the expert to try to increase the engagement of the feed rolls so as to eliminate the slip risk. This, however, requires such substantial roll pressures or the arrangement of spikes or corresponding grip members projecting from the rolls, that there is risk that the surface wood will be damaged seriously. Also in this case, thus, a reduced market value or rejection of the timber can be expected.

This problem is solved in a unique way by the arrangement according to the invention which is characterized in that it comprises two diametrically opposed measuring rollers resiliently pressed against the stem surface and placed immediately upstream of a cross-cutting member serving for cross-cutting the stem, one of the measuring rollers being connected to a first transmitter for signaling the stem length corresponding to the rotation of the measuring roller to a control unit, which is adapted, in response to the signal that a predetermined stem piece length has been achieved, to stop the feed unit and to start the movement of the cross-cutting member against the stem.

The invention is described in greater detail in the following, with reference to the accompanying drawing showing in a schematic way a plane view of a combined delimbing and cross-cutting machine equipped according to the invention.

In the FIGURE, 1 designates the last part of a tree stem, which by feed rolls 2 and 3 is driven to the right in the FIGURE. Upstream of the rolls (i.e. to the left in the FIGURE) a delimbing unit is shown symbolized by two shearing knives 4 and 5, and immediately upstream thereof is indicated a knife 6 for cutting off the tree top rated as waste. At a substantial distance downstream of the drive rolls, to the side of stem 1, a cross-cutting knife 7 is mounted so as to be able to move perpendicularly to and from the stem for cross-cutting it to pieces of desired length. Immediately upstream of the cutting plane of the knife 7 a roller 8 is mounted for supporting the stem. Said supporting roller 8 is driven synchronously with the feed rolls.

According to the invention, two diametrically opposed measuring rollers 9 and 10 engage with the stem 1 in a place somewhat upstream of the supporting roller 8. The measuring rollers are each mounted for free-running at one end of arms 11 and 12 respectively, which extend substantially parallel with the stem and which are rotatably mounted at fixed points 13 and 14 respectively at their other ends. From said other ends of the arms there extend in a lower plane (relative to the plane of the drawing) levers 15 and 16, respectively between the ends of which a double-acting hydraulic means 17 is connected. A pressure accumulator T is connected to the pressure line 18 of the means 17 to contract the means and thereby to urge the measuring rollers 9, 10 against the stem 1. The dash-dotted line K between the pressure lines of the hydraulic means and roll 3 indicates in a schematic way that the measuring rollers are operated synchronously with the feed rolls, so that the measuring rollers and the feed rolls are separated simultaneously to receive the stem 1 laid down from above and thereafter to be applied simultaneously to the stem. The dash-dotted yoke B between the measuring rollers 9 and 10 represents a device, which indicates the distance between the rollers and thereby the stem diameter.

A first transmitter $G_1$ is connected to the measuring roller 9 in order to send a mechanical or electrical signal, to a first input of a control unit S for example one metering impulse or signal per 7.5 mm stem length, which signal corresponds to the rotation of the roller 9 and thus to the stem advance length corresponding thereto. A second transmitter $G_2$ is connected to the yoke B for the stem diameter in order to send to a second input on the control unit S a signal corresponding to the stem diameter. The two transmitters further send their signals to a combined integrator-indicator device V. The control unit S has two outputs for actuating the movement of the cross-cutting knife 7 and also the feed rollers 2 and 3 to and from the stem 1.

The arrangement described above operates in the way as follows.

When a tree stem has been positioned between the knives 4 and 5 and feed rollers 2 and 3, then in the control unit S there are set or "stored" the desired lengths of the timber pieces and the minimum diameter thereof, below which the stem would not be classified as timber but rather as pulp wood.

Subsequent to the application of knives and rolls, the drive unit for the feed rolls is started, so that the stem end portion is guided by the arms 11 and 12 which are urged against the stem into contact with the measuring rollers 9 and 10. The feed rolls pull the stem through the set of knives 4 and 5 for shearing off limbs and branches, whereby the stem separates the rollers 9 and 10 and in its turn drives them, which rollers by the action of the pressure accumulator T are held in a resilient and slip-free engagement with the tree stem, which decreases in diameter whilst being advanced. The measuring rollers 9 and 10 via the transmitters $G_1$ and B–$G_2$ give continuous information to the control unit S on the real stem length advanced (independently of any slippage which may occur between the feed rolls and stem) and also on the stem diameter at any moment.

The control unit, when it has received from the transmitter $G_1$ the number of (mechanical or electrical) metering impulses corresponding to the desired timber length, sends a signal to the feed rolls 2 and 3 for stopping the feed and a signal to the cross-cutting knife 7 for instantaneous movement against the stem to cross-cut the same. From the time when the stem feed was commenced, to the cross-cutting operation, the transmitters $G_1$ and $G_2$ also have continuously sent their information to the integrator-indicator device V which, on the basis of the length and diameter information received, progressively integrates the volume of the timber piece. The value of this volume at the moment of cross-cutting can be read from an indicator at V.

The operation described above is repeated up to the situation shown in the FIGURE, where it is assumed that the timber length 1 is next in turn to be separated. If the diameter transmitter $G_2$ records the value of the minimum diameter initially in the control unit before the timber length initially preset in the control unit S and continuously measured by the length transmitter $G_1$ has been achieved, then the control units reacts immediately on receipt of this signal from the transmitter $G_2$ by ordering the feed 2 and 3 to stop rolls and the cross-cutting knife 7 to, cross-cut. Without a signal from $G_2$, however, that the minimum diameter has been reached, the cross-cutting, of course, will be carried out in due course with a full length of the timber.

Also the pulp wood lengths following thereafter can be preset in the control unit, and the operation will be the same as during the cross-cutting of timber.

In the FIGURE is shown, for reason of simplicity, only a single length II for pulp wood. The tree top III, which cannot be utilized as timber, mostly is cut off by the top knife 6, which is operated separately. When thereafter the rear end of the pulp wood piece II leaves the feed rolls 2 and 3, it continues to be advanced by the supporting roller 8 while being guided laterally by the still engaging measuring rollers 9 and 10. The engagement of said rollers also prevents the last length II from tilting downwardly too violently about the supporting roller 8 in the final phase of the discharge.

Even when it is normally expected that the stem feed will be stopped immediately when the feed rolls receive the order from the control unit to stop for cross-cutting, one cannot protect oneself against a forward slip of the stem or a defect in the drive transmission. An unintended continued stem feed, when the cross-cutting knife 7 engage the stem, may cause the knife to break, which would involve great risks to the operator and an expensive breakdown for knife exchange. Therefore, the control unit can be so adapted upon receipt of a further metering impulse (corresponding, for example, to said 7.5 mm feed of the stem) from the transmitter $G_1$ still driven by the measuring rollers, in addition to the usual number of impulses stipulated for the preset timber length, to inhibit or interrupt the movement of knife 7 against the stem.

The arrangement described above, thus, provides a guarantee for accurate desired timber and pulp wood lengths, and thereby also for accurate volume values, with a minimum of waste, while with conventional systems, by which the measuring of length was dependent on the rotation of the feed rolls, one often had to reduce the value of valuable timber parts, i.e. of the timber lengths with the greatest diameter, because when working with spruces it is just these parts which carry the thickest branches and therefore have given rise to marked slipping tendencies and, thus, to much too short timber lengths.

The invention is not restricted to the embodiment described above, but different modifications can be imagined within the scope of the invention. In principle, for example, a single measuring roller would be sufficient, though then the automatic volume determination may provide special problems. Furthermore, the elastic application of the measuring rollers (roller) could be effected in a way other than the one shown, for example by means of a spring arrangement acting upon either swinging levers (as shown) for the measuring rollers or on holders supporting the rollers, which holders may be guided in guide means perpendicular to the path of motion of the stem.

The invention, of course, could be applied also to the known stem processing arrangements where instead of feed rolls drag tongs are used for skidding the stem through the delimbing unit. The measuring principles of the invention could in general be utilized advantageously for determining the dimension of wood other than tree stems or of other oblong objects, such as metal or plastic pipes etc.

What I claim is:

1. An arrangement for measuring and cross-cutting tree stems advanced in their longitudinal directions by a feed unit, comprising a cross-cutting member for cutting the stem, two rollers mounted for engaging the stem at diametrically opposed positions immediately upstream of said cross-cutting member, support means for resiliently urging said rollers against the stem surface, a first transmitter connected to one of said rollers, and a control unit connected to the feed unit and to said cross-cutting member, the output of said transmitter being coupled to the input of the control unit for signaling to said control unit the stem length corresponding to the rotation of said one of said rollers, the control unit delivering, in response to the signal that the stem had reached a predetermined section length, an output signal to stop the feed unit, and an output signal to start the operation of said cross-cutting member for cutting the stem.

2. An arrangement according to claim 1 and further comprising a device including means for continuously sensing the distance between the two rollers corresponding to the varying stem diameter, a second transmitter, the output of said device being connected to said second transmitter, an indicator connected to both the output of said first transmitter and the output of said second transmitter to indicate the volume of the stem section, said second transmitter also having an output connected to said control unit for signaling, in response to a stem diameter below a predetermined minimum, a forced stop of the feed unit and a start of said cross-cutting member.

3. An arrangement according to claim 1 wherein said first transmitter in response to continued rotation of the rollers caused by an unintended advance of the stem after the cross-cutting member has received an order from the control member to start operation, sends a signal to the control unit to stop the motion of the cross-cutting member.

4. An arrangement according to claim 1 wherein said support means comprises a pair of arms, each of the rollers being mounted at one end of one of said arms, the other end of each arm being pivotally mounted at a fixed point, and hydraulic means mounted between the two arms for resiliently urging the rollers against the stem.

5. An arrangement according to claim 4, and further comprising a pressure accumulator disposed in the feed line to said hydraulic means to permit resilient operation of said rollers.

* * * * *